US009235438B2

(12) United States Patent
Sugimura

(10) Patent No.: US 9,235,438 B2
(45) Date of Patent: Jan. 12, 2016

(54) IMAGE DISPLAY APPARATUS, IMAGE DISPLAY METHOD, AND COMPUTER PROGRAM PRODUCT

(71) Applicant: Kazunori Sugimura, Kanagawa (JP)

(72) Inventor: Kazunori Sugimura, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 272 days.

(21) Appl. No.: 13/653,707

(22) Filed: Oct. 17, 2012

(65) Prior Publication Data

US 2013/0113684 A1 May 9, 2013

(30) Foreign Application Priority Data

Nov. 4, 2011 (JP) ................................. 2011-242739

(51) Int. Cl.
| | | |
|---|---|---|
| *G09G 5/00* | (2006.01) | |
| *H04M 1/66* | (2006.01) | |
| *H04M 1/68* | (2006.01) | |
| *H04M 3/16* | (2006.01) | |
| *G06F 9/48* | (2006.01) | |
| *G06F 3/14* | (2006.01) | |
| *G09G 3/00* | (2006.01) | |

(52) U.S. Cl.
CPC .............. *G06F 9/485* (2013.01); *G06F 3/1438* (2013.01); *G09G 3/002* (2013.01)

(58) Field of Classification Search
CPC ....... G06Q 10/06; G06Q 50/06; G06Q 50/08; B65H 2220/01; B65H 2511/415; H04N 2201/0082
See application file for complete search history.

(56) References Cited

U.S. PATENT DOCUMENTS

| | | | |
|---|---|---|---|
| 5,452,459 A | 9/1995 | Drury et al. | |
| 2003/0184800 A1* | 10/2003 | Ohara | 358/1.15 |
| 2004/0156074 A1* | 8/2004 | Kim | 358/1.15 |

(Continued)

FOREIGN PATENT DOCUMENTS

| | | |
|---|---|---|
| JP | 05-088602 | 4/1993 |
| JP | 2004-240825 | 8/2004 |

(Continued)

OTHER PUBLICATIONS

Extended European Search Report issued Feb. 22, 2013 in Patent Application No. 12189058.6.

(Continued)

*Primary Examiner* — Alexander Eisen
*Assistant Examiner* — Nan-Ying Yang
(74) *Attorney, Agent, or Firm* — Oblon, McClelland, Maier & Neustadt, L.L.P.

(57) ABSTRACT

An image display apparatus is connected to an external device through a network. The image display apparatus includes: a communication unit that receives, from an external device, a request to create a display job to perform displaying an image and a request for display in which a display job is specified and sends a reply for a request to create a display job to an external device; a job creation unit that creates a display job when a request to create the display job is received; and an execution control unit that instructs a specified display job to perform displaying an image when a request for display is received from an external device. The communication unit includes, in a reply for a request to create a display job, identification information of the display job. A display job is specified based on identification information in a request for display.

9 Claims, 8 Drawing Sheets

(56) References Cited

U.S. PATENT DOCUMENTS

| | | |
|---|---|---|
| 2004/0267981 A1 | 12/2004 | Kakemura |
| 2006/0141986 A1* | 6/2006 | Shinozaki .................... 455/410 |
| 2012/0239830 A1 | 9/2012 | Sugimura et al. |

FOREIGN PATENT DOCUMENTS

| | | |
|---|---|---|
| JP | 2005-051446 | 2/2005 |
| JP | 2005-149440 A | 6/2005 |
| JP | 2007-121966 | 5/2007 |
| JP | 2008-089886 A | 4/2008 |

OTHER PUBLICATIONS

JP 2007-121966 A Previously Filed, Filing Database WPI, Thomson Scientific, AN 2007-549864, XP-002690396, May 17, 2007, 2 pages.

Anonymous: "DCE 1.1: Remote Procedure Call—Chapters 1, 2 and 6", The Open Group, XP-002690397, 1997, Retrieved from the Internet: URL:http://pubs.opengroup.org/onlinepubs/9629399/toc.pdf, p. 1-54 and p. 357-374 and cover pages.

* cited by examiner

IMAGE DISPLAY APPARATUS, IMAGE DISPLAY METHOD, AND COMPUTER PROGRAM PRODUCT

CROSS-REFERENCE TO RELATED APPLICATIONS

The present application claims priority to and incorporates by reference the entire contents of Japanese Patent Application No. 2011-242739 filed in Japan on Nov. 4, 2011.

BACKGROUND OF THE INVENTION

1. Field of the Invention

The present invention relates to an image display apparatus, an image display method, and a computer program product.

2. Description of the Related Art

An image display apparatus such as a projector has been already known to be installed in a meeting room or a lecture room, for example, and to be connected to an external device such as a personal computer (PC) through a red-green-blue (RGB) cable or a network (wire communication or wireless communication) when a participant or a presenter projects and displays an image.

For example, as disclosed in Japanese Patent Application Laid-open No. 2005-051446, a technology relating to a method of synchronizing contents to be projected on a plurality of projecting apparatuses in order to achieve efficiency of a meeting has been known.

Further, for example, as disclosed in Japanese Patent Application Laid-open No. 2007-121966, a technology relating to a method of connecting a plurality of computers to a projecting apparatus in order to achieve efficiency of a meeting has been known. According to the technology disclosed in Japanese Patent Application Laid-open No. 2007-121966, control of switching when a certain condition such as time is met is performed in order to avoid a malfunction.

When an image display apparatus and an external device are connected through a network to project and display an image on the image display apparatus by operating an external device, dedicated software is often installed on the external device or the like. Recently, there is a demand to allow various processing relating to projecting and displaying an image to be executed from the external device thorough a network. In order to meet such a demand, development of dedicated software as described above needs to be streamlined.

There is a need to provide an image display apparatus, an image display method, and a computer program product capable of streamline development of software or the like necessary for projecting and displaying an image on an image display apparatus by operating an external device that is connected to the image display apparatus through a network.

SUMMARY OF THE INVENTION

It is an object of the present invention to at least partially solve the problems in the conventional technology.

An image display apparatus is connected to one or more external devices through a network. The image display apparatus includes: a communication unit that receives, from an external device, a request to create a display job to perform displaying an image and a request for display in which a display job is specified and sends a reply for a request to create a display job to an external device; a job creation unit that creates a display job when a request to create the display job is received; and an execution control unit that instructs a specified display job to perform displaying an image when a request for display is received from an external device. The communication unit includes, in a reply for a request to create a display job, identification information of the display job created by the job creation unit to send the identification information, and receives a request for display in which the display job is specified based on the identification information.

An image display method is performed on an image display apparatus connected to one or more external devices through a network. The image display method includes: receiving, from an external device, a request to create a display job to perform displaying an image and a request for display in which a display job is specified and sending a reply for a request to create a display job to an external device; creating a display job when a request to create the display job is received; and instructing a specified display job to perform displaying an image when a request for display is received from an external device. At the sending, identification information of a display job created at the creating is contained in a reply for a request to create the display job to send the identification information. At the receiving, a request for display in which the display job is specified based on the identification information is received.

A computer program product includes a non-transitory computer-usable medium having computer-readable program codes embodied in the medium. The program codes when executed causes a computer connected to one or more external devices through a network to execute: receiving, from an external device, a request to create a display job to perform displaying an image and a request for display in which a display job is specified and sending a reply for a request to create a display job to an external device; creating a display job when a request to create the display job is received; and instructing a specified display job to perform displaying an image when a request for display is received from an external device. At the sending, identification information of a display job created at the creating is contained in a reply for a request to create the display job to send the identification information. At the receiving, a request for display in which the display job is specified based on the identification information is received.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An image display apparatus, an image display method, and a program will now be described in detail with reference to accompanying drawings. In the embodiments below, an example that is applied to a projector as an image display apparatus is explained. The present invention, however, is not limited thereto and can be applied to any apparatus that displays an image.

First Embodiment

An image display system according to the present embodiment is structured so that a projector as an image display apparatus and one or more personal computers (PCs) as an external device are connected to a network such as the Internet.

Figure 1:
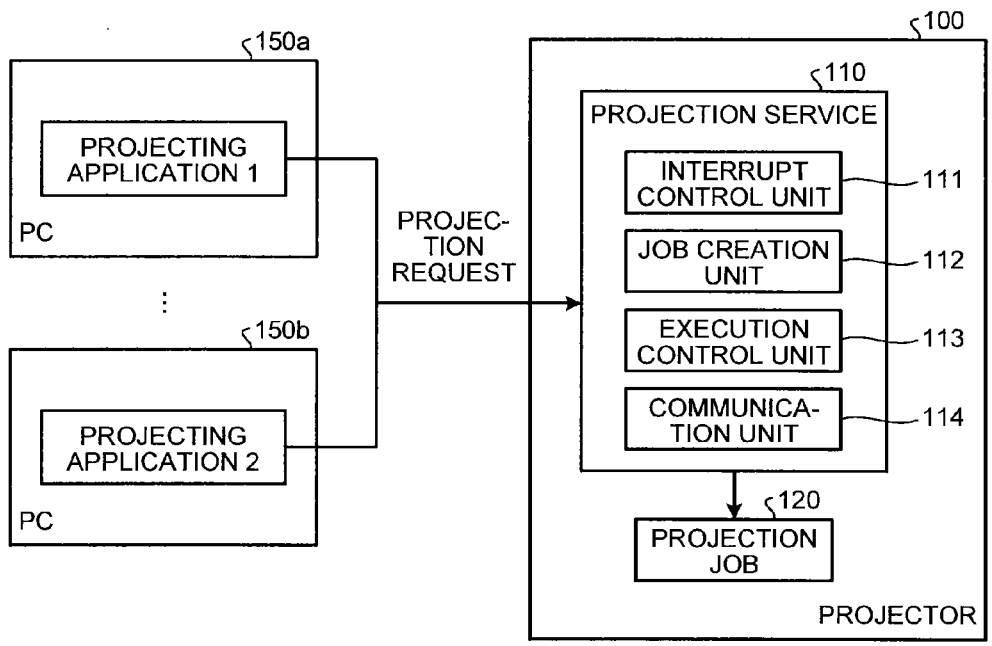
FIG. 1 is a block diagram illustrating function structure of a PC and a projector according to a first embodiment.

FIG. 1 is a block diagram illustrating function structure of the PC and the projector according to the first embodiment of the present invention. In a PC 150*a* and a PC 150*b* (hereinafter, collectively referred to as a "PC 150" as necessary), a projecting application 1 and a projecting application 2 operate, respectively.

The projecting applications 1, 2 send a projection resource creation request, which is a request to create a projection job, to a projector 100. The projecting applications 1, 2 each send a projection request, which is a request to project and display an image, to the projector 100.

In these projection resource creation request or projection request, no information of a request source such as identification information of the projecting applications 1, 2, or identification information of the PC 150 is specified. The projecting applications 1, 2 include information, specifying an ID (described later) of a projection job to be caused to perform projecting and displaying an image, in a projection request. This ID is an ID of a projection job specified by the projector 100 in a reply for a projection resource creation request sent by the projecting applications 1, 2 to the projector 100.

The projector 100 is an apparatus to project and display an image on a projection screen. As illustrated in FIG. 1, the projector 100 according to the present embodiment has a projection service 110 that creates a projection job 120. Here, a projection job is a job to perform projecting and displaying an image.

The projection service 110 performs processing relating to projecting and displaying an image and includes a communication unit 114, an interrupt control unit 111, a job creation unit 112, and an execution control unit 113.

The communication unit 114 receives a projection resource creation request and a projection request, in which an ID of a projection job is specified, from the projecting applications 1, 2 in the PC 150. In the present embodiment, the communication unit 114 is configured not to send a request to the PC 150. That is to say, the communication unit 114 sends only a reply for a received projection resource creation request and a reply for a received projection request to a request source, but does not autonomously send any requests to the PC 150.

The communication unit 114 includes, in the projection resource creation request, an ID of a projection job (identification information to identify a projection job), which is created in the job creation unit 112 described later, to send the ID. This ID of a projection job is used by the applications 1, 2 in the PC 150 to specify a projection job to be caused to perform projecting. That is to say, the communication unit 114 receives a projection request in which a projection job is specified by an ID.

The interrupt control unit 111 switches an interrupt state for a projection job between an interrupt permission state and an interrupt prohibition state.

The job creation unit 112 creates a projection job when the communication unit 114 receives a projection resource creation request. The job creation unit 112 includes an above-mentioned ID to identify a job into a created projection job. Further, the job creation unit 112 determines an interrupt state for a projection job. If the interrupt state is the interrupt prohibition state, the job creation unit 112 creates no new projection job even if the communication unit 114 receives a new projection resource creation request from the PC 150.

The execution control unit 113 instructs a projection job, an ID of which is specified in a projection request, to perform projecting and displaying an image when the communication unit 114 receives the projection request from the PC 150. Accordingly, the projection job performs projecting and displaying an image.

When it is determined that an interrupt state for a projection job is the interrupt prohibition state and if an ID of a projection job that has been specified in a projection request received by the communication unit 114 from the PC 150 differs from an ID of a projection job being performed, the execution control unit 113 does not instruct the projection job, the ID of which has been specified in the projection request, to perform projecting and displaying an image.

Figure 2:
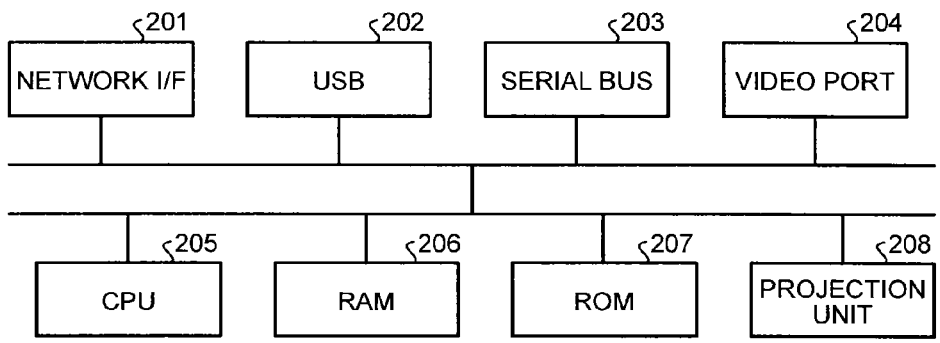
FIG. 2 is a block diagram illustrating an example of hardware structure of the projector.

Hardware structure of the projector 100 will now be described. FIG. 2 is a block diagram illustrating an example of hardware structure of the projector 100. As illustrated in FIG. 2, the projector 100 has, as main hardware structure, structure in which a central processing unit (CPU) 205, a read-only memory (ROM) 207, a random-access memory (RAM) 206 a projection unit 208, a video port 204, a USB 202, a serial bus 203, and a network interface (I/F) 201 are connected to a bus.

The CPU 205 is an arithmetic unit to control entire processing of the projector 100. The RAM 206 stores therein necessary data for various processing performed by the CPU 205. The ROM 207 stores therein a computer program or the like to perform various processing performed by the CPU 205.

The projection unit 208 is an apparatus to project document data. The projection unit 208 performs projection, for example, enlarges light emitted from a liquid crystal panel using an optical system including a lense to perform projection. A projection method used by the projection unit 208 is not limited to this example and various projection methods that have been used such as a method in which a light emitting diode (LED) is used as a light source can be applied.

The video port 204 is an input port used by connecting to a PC or the like to receive an image from the PC or the like to project the image. The network interface (I/F) 201 is an interface to connect with an external device such as the PC 150 through a network and to send and receive data to and from the connected external device.

Figure 3:
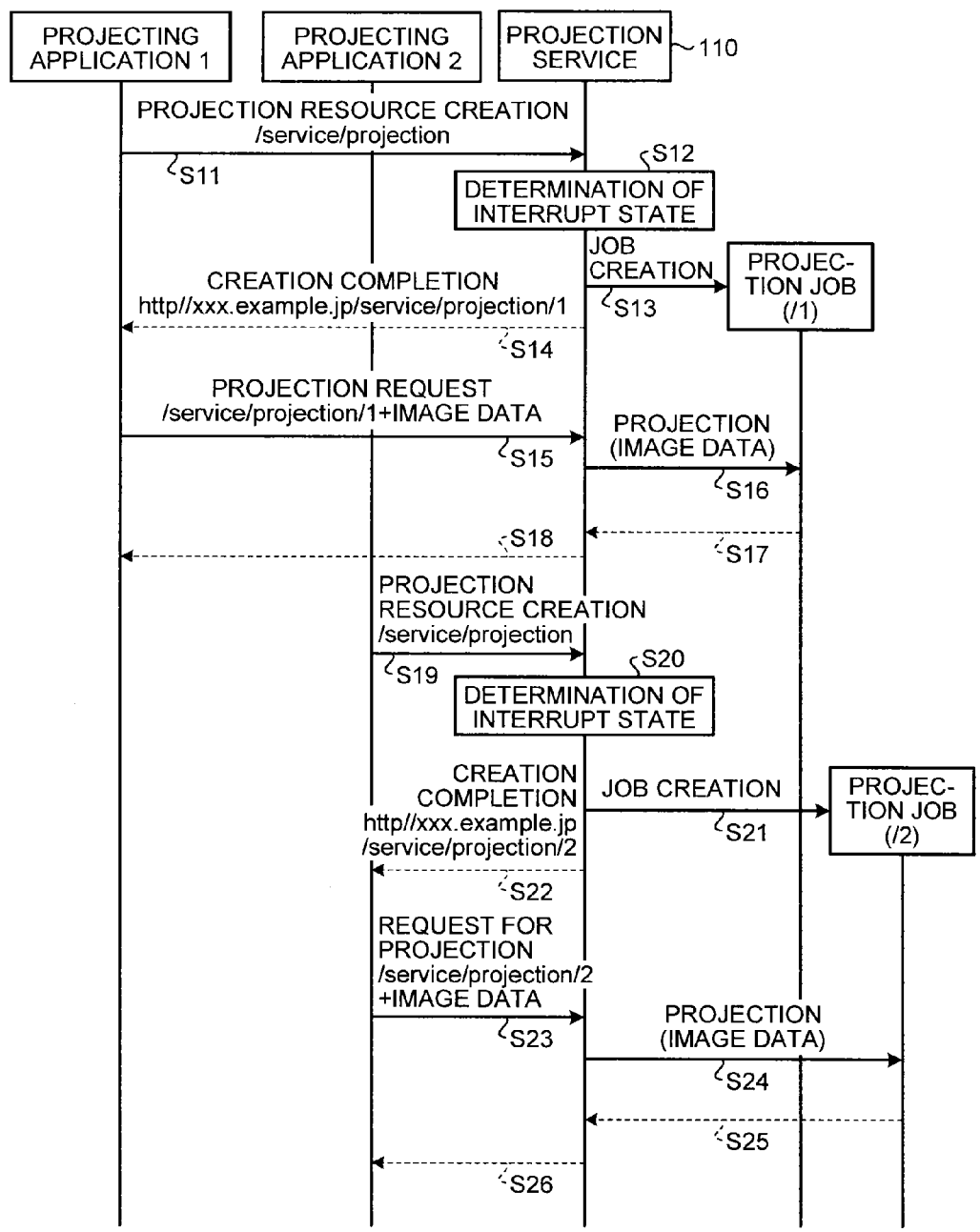
FIG. 3 is a sequence diagram of image display processing of the first embodiment.

Image display processing according to the present embodiment structured as described above will now be described. FIG. 3 is a sequence diagram of image display processing of the first embodiment. A projection resource creation request is sent from the projecting application 1 in the PC 150*a* to the projection service 110 in the projector 100 (Step S11).

When the communication unit 114 of the projector 100 receives the projection resource creation request, the job creation unit 112 determines an interrupt state (Step S12) and creates a projection job (Step S13). An ID of the created projection job is 1. An ID of a projection job is represented by a number after a symbol "/". In this example, assume that an interrupt state is set to the interrupt permission state. Determination processing to determine an interrupt state will be described in detail later.

When the projection job (/1) is created, the projection service 110 sends, as a reply for the projection resource creation request, a notification of creation completion to the projecting application 1 in the PC 150a that is a request source (Step S14). In the notification of creation completion, the ID of the created projection job is included. Specifically, "/1" at the last of an http command representing the notification of creation completion in FIG. 3 denotes that ID=1 is specified.

Assume that a projection request in which ID=1 is specified by "/1" and image data to be projected are then sent from the projecting application 1 in the PC 150a to the projector 100 (Step S15). The communication unit 114 of the projector 100 receives the projection request and the image data, and the execution control unit 113 instructs the projection job having the ID=1 to project the image data (Step S16). Accordingly, the projection job having the ID=1 performs projecting and displaying the image data. The projection job sends a notification of projection to the projection service 110 (Step S17). The communication unit 114 of the projection service 110 sends the notification of projection as a reply for the projection request to the application 1 in the PC 150a that is a request source (Step S18).

Assume that a projection resource creation request is then sent from the projecting application 2 in the PC 150b to the projection service 110 in the projector 100 (Step S19).

When the communication unit 114 of the projector 100 receives the projection resource creation request, the job creation unit 112 determines an interrupt state (Step S20) and creates a projection job (Step S21). An ID of the created projection job is 2.

When the projection job (/2) is created, the projection service 110 sends a notification of creation completion to the projecting application 2 in the PC 150b that is a request source (Step S22). In the example illustrated in FIG. 3, ID=2 is specified by "/2" at the last of a http command representing the notification of creation completion.

Assume that a projection request in which an ID=2 is specified by "/2" and image data to be projected are then sent from the projecting application 2 in the PC 150b to the projector 100 (Step S23). The communication unit 114 of the projector 100 receives the projection request and the image data, and the execution control unit 113 instructs the projection job having the ID=2 to project the image data (Step S24). Accordingly, the projection job having the ID=2 performs projecting and displaying the image data. The projection job sends a notification of projection to the projection service 110 (Step S25). The communication unit 114 of the projection service 110 sends the notification of projection as a reply for the projection request to the application 2 in the PC 150b that is a request source (Step S26).

In this way, in the projector 100, when a projection job is created, an ID of the created projection job is contained in a reply for a request to inform the projecting application, which is a request source, of the ID. Then, in a projection request from the projecting application, the ID of the projection job is specified without specifying information of the request source such as identification information of the projecting application or the PC 150. That is to say, the projector 100 does not need to know the identification information of the PC 150 or the applications 1, 2. From the projector 100 to the PC 150, only notification is performed and no request is performed.

As a result, the projector 100 can project an image and perform interrupt control without holding information on the request source, making it possible to reduce degree of coupling between a component of the PC 150 and a component of the projector 100 (in other words, making it possible to loosely couple a component of the PC 150 and a component of the projector 100).

Figure 4:
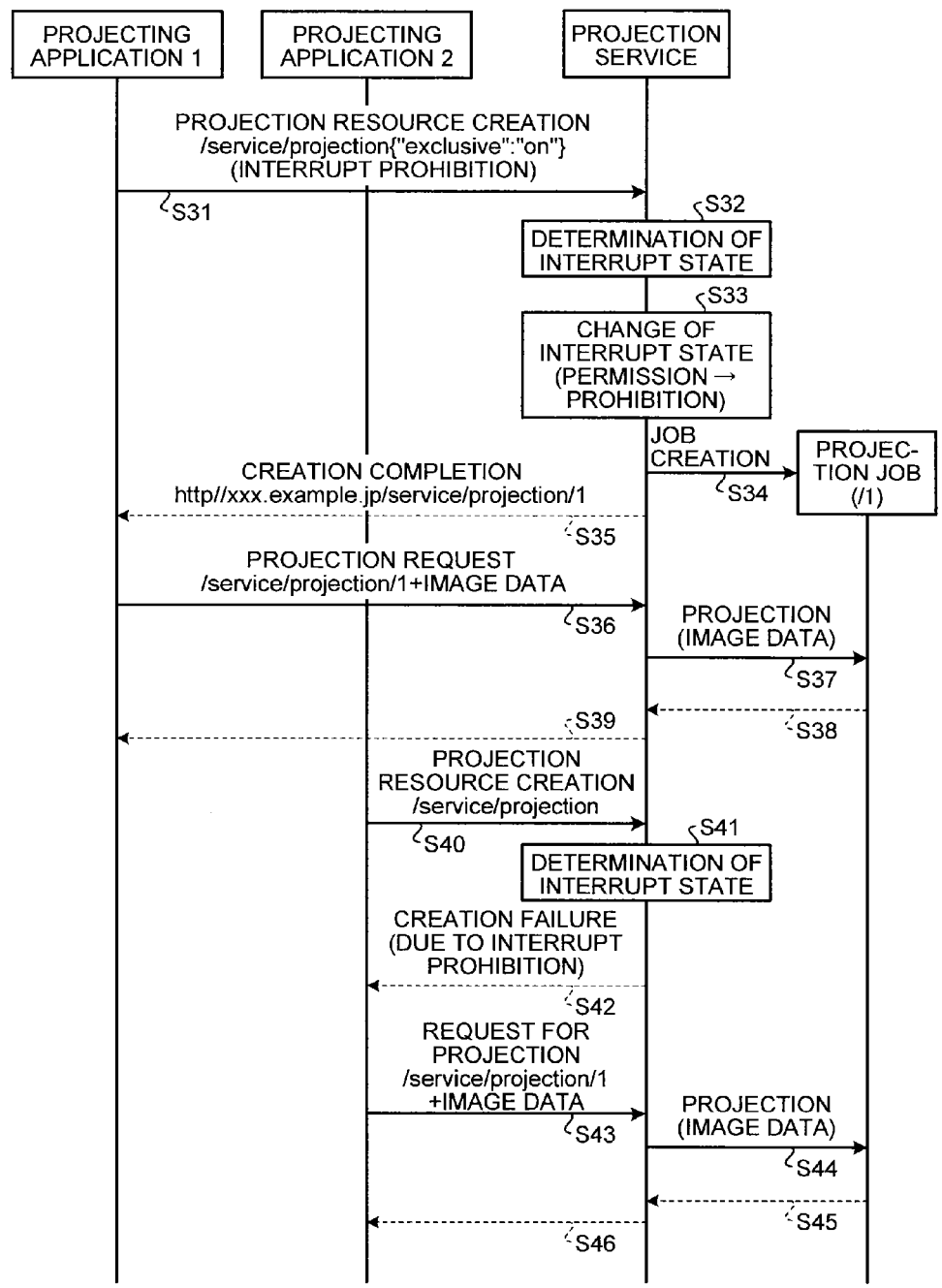
FIG. 4 is a sequence diagram of image display processing when an interrupt state is an interrupt prohibition state in the first embodiment.

FIG. 4 is a sequence diagram of image display processing when an interrupt state is the interrupt prohibition state in the first embodiment of the present invention. The processing from the projection resource creation request through projection by the projection job (ID=1) to notification (Steps S31 to S39) is performed in the same manner as illustrated in FIG. 3. In this example, however, after determination of an interrupt state in the projection service 110 (Step S32), the interrupt control unit 111 switches an interrupt state from the interrupt permission state to the interrupt prohibition state (Step S33). Accordingly, an interrupt of a projection resource creation request will be prohibited from now on.

Specifically, assume that a projection resource creation request is sent from the projecting application 2 in the PC 150b to the projector 100 (Step S40). The projector 100 receives a projection resource creation request at the communication unit 114 of the projection service 110 and determines an interrupt state (Step S41).

Figure 5:
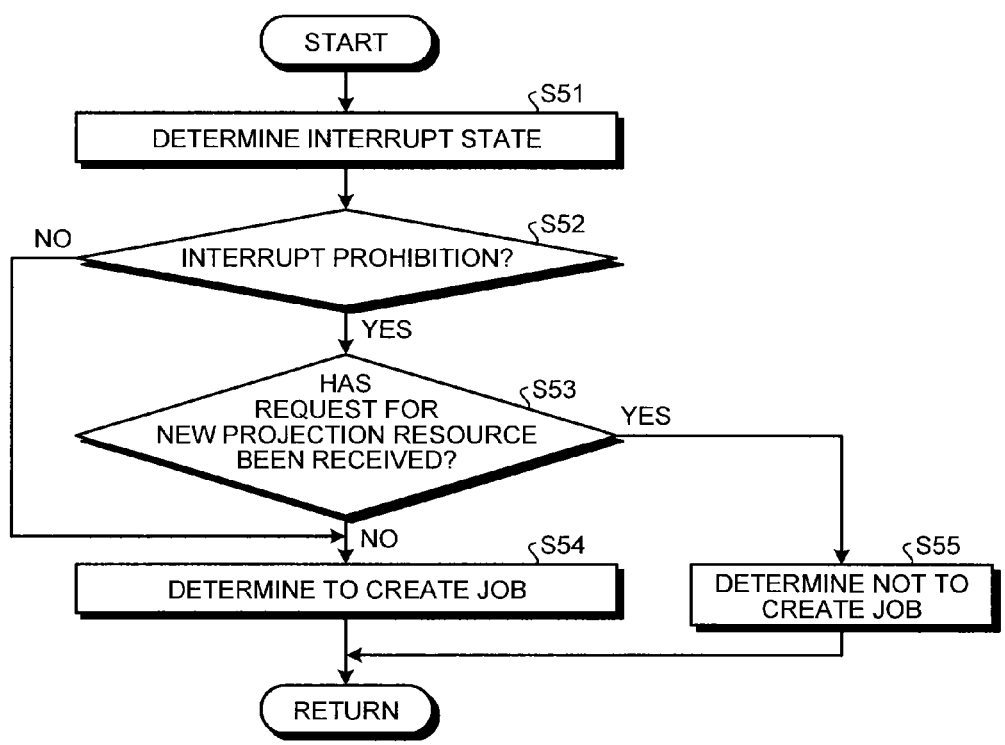
FIG. 5 is a flowchart illustrating a procedure of interrupt determination processing in the first embodiment.

Interrupt determination processing will now be described in detail. FIG. 5 is a flowchart illustrating a procedure of interrupt determination processing of the first embodiment of the present invention. The job creation unit 112 determines a present interrupt state by reading a setting of a memory or the like (not illustrated) (Step S51). Then, the job creation unit 112 determines whether the present interrupt state is in the interrupt prohibition state (Step S52). If the interrupt state is in the interrupt prohibition state (Yes at Step S52), the job creation unit 112 determines whether a new projection resource creation request has been received (Step S53). If the job creation unit 112 has determined that a new projection resource creation request has been received (Yes at Step S53), the job creation unit 112 determines not to create a projection job (Step S55).

On the other hand, at Step S53, if the job creation unit 112 has determined that a new projection resource creation request has not been received (No at Step S53), the job creation unit 112 determines to create a new projection job (Step S54).

At Step S52, if the present interrupt state is not the interrupt prohibition state (No at Step S52), that is, if the present interrupt state is the interrupt permission state, the job creation unit 112 creates a new projection job without determination at Step S53 (Step S54).

With reference to FIG. 4 again, in this example, the interrupt state is the interrupt prohibition state. The projection resource creation request at Step S40 is a new projection resource creation request other than the projection job already created and having an ID=1. As a result of determining the interrupt state at Step S51, the job creation unit 112 does not create a projection job. Then, the communication unit 114 notifies the application 2 in the PC 150b, which is a request source, of the failure of creation (Step S42).

Assume that, after that, a projection request in which an ID=1 is specified by "/1" and image data to be projected are sent from the same projecting application 2 in the PC 150b to the projector 100 (Step S43). The communication unit 114 of the projector 100 receives the projection request and the image data, and the execution control unit 113 instructs the projection job having an ID=1 to project the image data (Step S44). Accordingly, the projection job having an ID=1 performs projecting and displaying the image data. The projection job sends a notification of projection to the projection service 110 (Step S45). The communication unit 114 of the projection service 110 sends a notification of projection to the application 2 in the PC 150*b* that is a request source (Step S46).

If the projector receives a projection request, in which an ID of a projection job other than the projection job having an ID=2 is specified, from the projecting applications 1, 2 in the PC 150 and even if the projection job (/2) has been created, the execution control unit 113 does not instruct the projection job having the ID=2 to perform projecting and displaying an image in response to the projection request.

As a result, the projecting applications 1, 2 and the PC 150 can realize interrupt control at the projector 100 without sending their own identification information to the projector 100.

In this way, according to the embodiment, the projector 100 notifies a projecting application, which is a request source, of an ID of a projection job. After that, the projecting applications 1, 2 specify the ID of the projection job to access the projector 100 without specifying information of the request source such as identification information of the projecting applications 1, 2 or the PC 150. Further, the projector 100 only performs a reply for a request to the PC 150 and performs no request. As a result, according to the present embodiment, the projector 100 can project an image and perform the interrupt control without holding information on the request source, thereby reducing the degree of coupling between a component of the PC 150 and a component of the projector 100, in other words, loose coupling of a component of the PC 150 and a component of the projector 100 can be made. Accordingly, when developing new software to perform projecting an image through a network, a software developer can develop the software without taking account of a request from the projector 100. At the projector 100, no processing in which a request source is taken into account is performed. The projector 100, therefore, needs no modification even if a new request source (software) is added. Therefore, according to the present embodiment, software development can be streamlined, and switching control can be performed easily. In addition, according to the present embodiment, control of an image display apparatus depending on a purpose such as a smooth interrupt display for use in a meeting room or a rejection of an interrupt display for use in a presentation can be achieved with a simple utility form.

Second Embodiment

Figure 6:
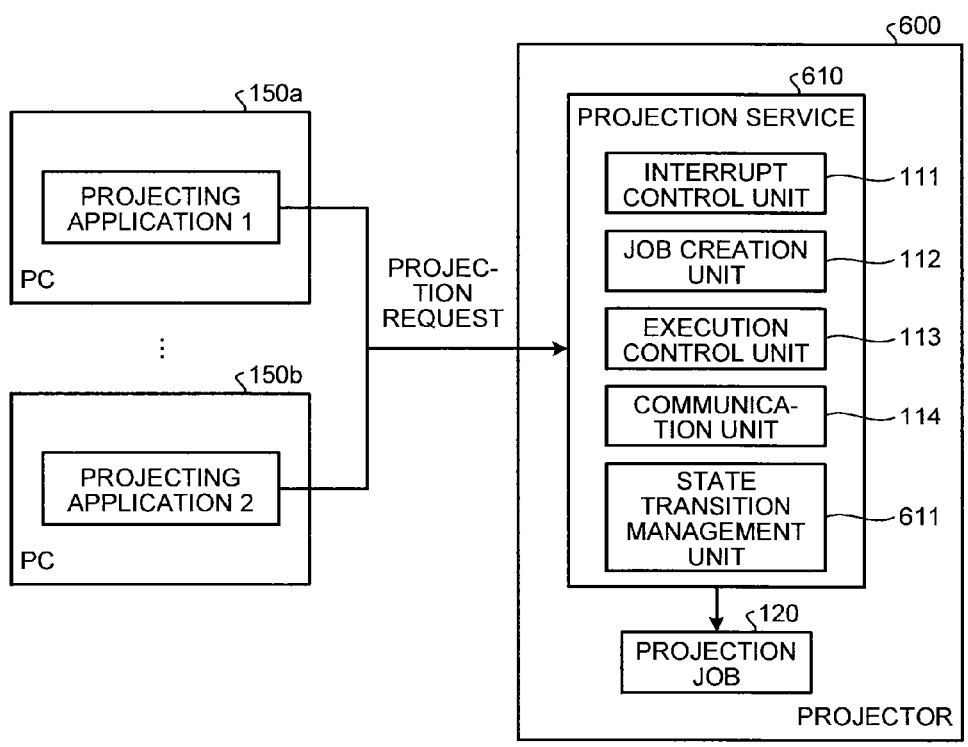
FIG. 6 is a block diagram illustrating function structure of a PC and a projector according to a second embodiment.

In a second embodiment, in addition to a function of the first embodiment, a projector manages its own state transition. FIG. 6 is a block diagram illustrating a function structure of the PC and a projector according to the second embodiment of the present invention.

An image display system according to the second embodiment of the present invention is structured so that a projector 600 and one or more PCs 150 are connected to a network such as the Internet as in the first embodiment. Structure of the PC 150 and a function of the projecting applications 1, 2 are the same as those of the first embodiment of the present invention.

As illustrated in FIG. 6, the projector 600 has a projection service 610 that creates the projection job 120. The projection service 610 performs processing relating to projecting and displaying an image and includes the communication unit 114, the interrupt control unit 111, the job creation unit 112, the execution control unit 113, and a state transition management unit 611. Functions of the communication unit 114, the interrupt control unit 111, the job creation unit 112, and the execution control unit 113 are the same as those of the first embodiment of the present invention.

The state transition management unit 611 causes a state of a projection job to transition between a created state (first state) indicating that a projection job is created and a projection state (second state) indicating that an image is being projected and displayed.

Because the projector 600 can actually project one image at a time, managing a lot of projection jobs results in consuming memory. For this reason, in the present embodiment, a state of a projection job is managed while classifying it into the two states: the created state and the projection state as described above.

Figure 7:
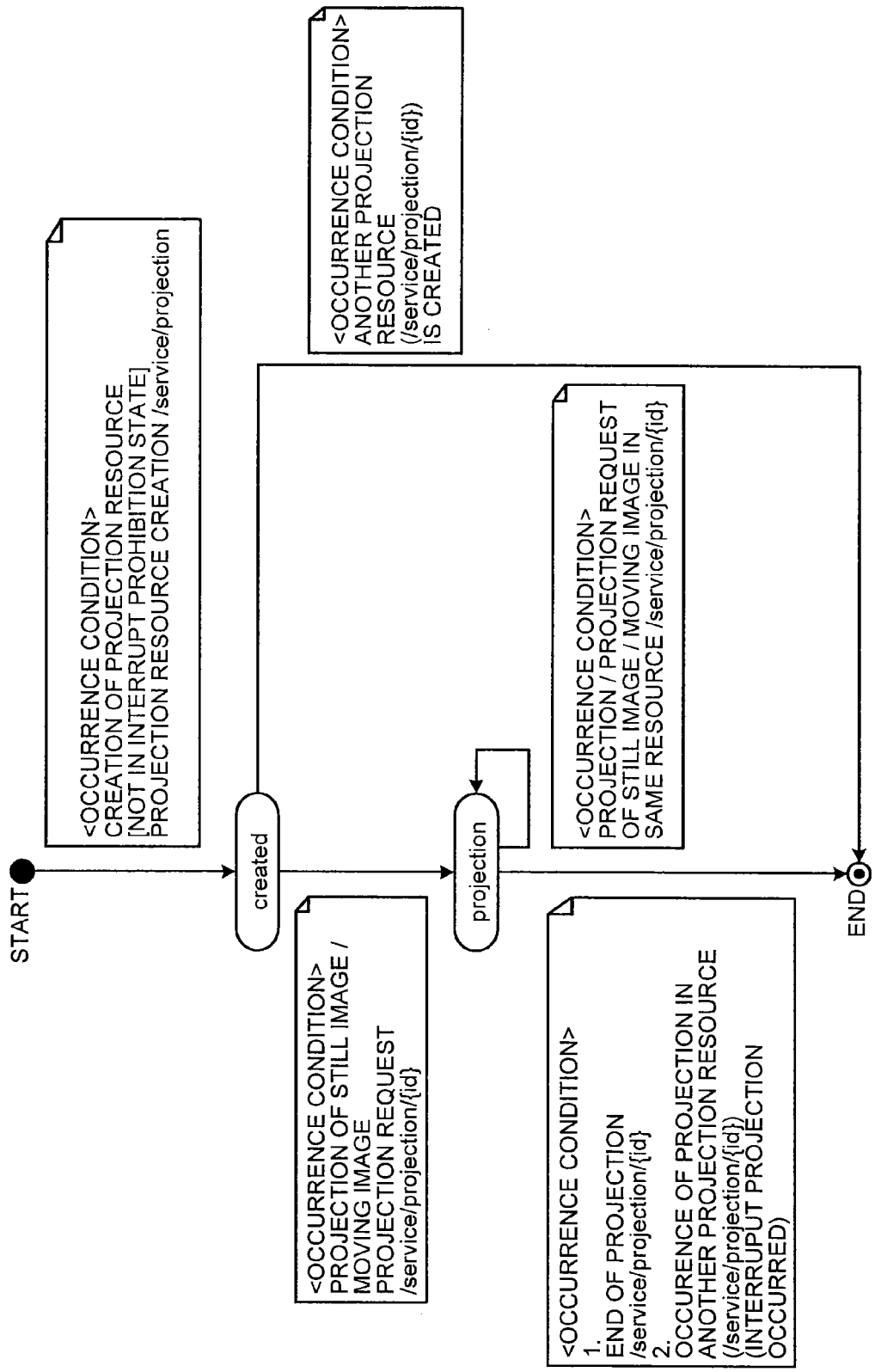
FIG. 7 is a state transition diagram of a projection job.

State transition of a projection job will now be described. FIG. 7 is a state transition diagram of a projection job. As illustrated in FIG. 7, a state of a projection job includes the created state (first state) and the projection state as described above. In FIG. 7, an occurrence condition means a condition causing a state to transition.

If a projection resource creation request is issued, for example, a projection job is created. Then, a state of the projection job transitions to the created state. If a projection request is issued to a projection job in the created state, the projection job transitions to the projection state.

The state transition management unit 611 controls deletion of a projection job so that a plurality of projection jobs do not exist in each of the states. That is to say, the projector 600 can basically project only one image at a time, rather than project a plurality of images at a time. The state transition management unit 611 performs control so that a plurality of projection jobs in the same state do not exist in each of the created state and the projection state. Therefore, if one of two projection jobs that initially coexisted at a time in different states transitions to the same state as the other projection job, the state transition management unit 611 deletes the one of the projection jobs. Accordingly, creating a lot of unnecessary projection jobs can be avoided.

In the example illustrated in FIG. 7, when a projection job is in the created state and if another projection resource creation request is issued, the projection job is deleted and processing ends. When a projection job is in the projection state and if a projection request to another projection resource or another projection job, the projection job in the projection state is deleted and processing ends.

The state transition management unit 611 performs control so that a plurality of projection jobs do not exist in each of the created state and the projection state as described above. This means that a plurality of projection jobs may exist as long as they are in different states. For example, a projection job (/1) having an ID-1 in the created state and a projection job (/2) having an ID=2 in the projection state can coexist. Even in this example, however, if a projection request to the projection job (/1) in the created state is issued, the projection job (/2) having an ID=2 in the projection state is deleted.

The job creation unit 112 creates the projection job taking account of this state transition. The execution control unit 113 instructs a projection job to perform projecting and displaying an image taking account of this state transition.

Figure 8:
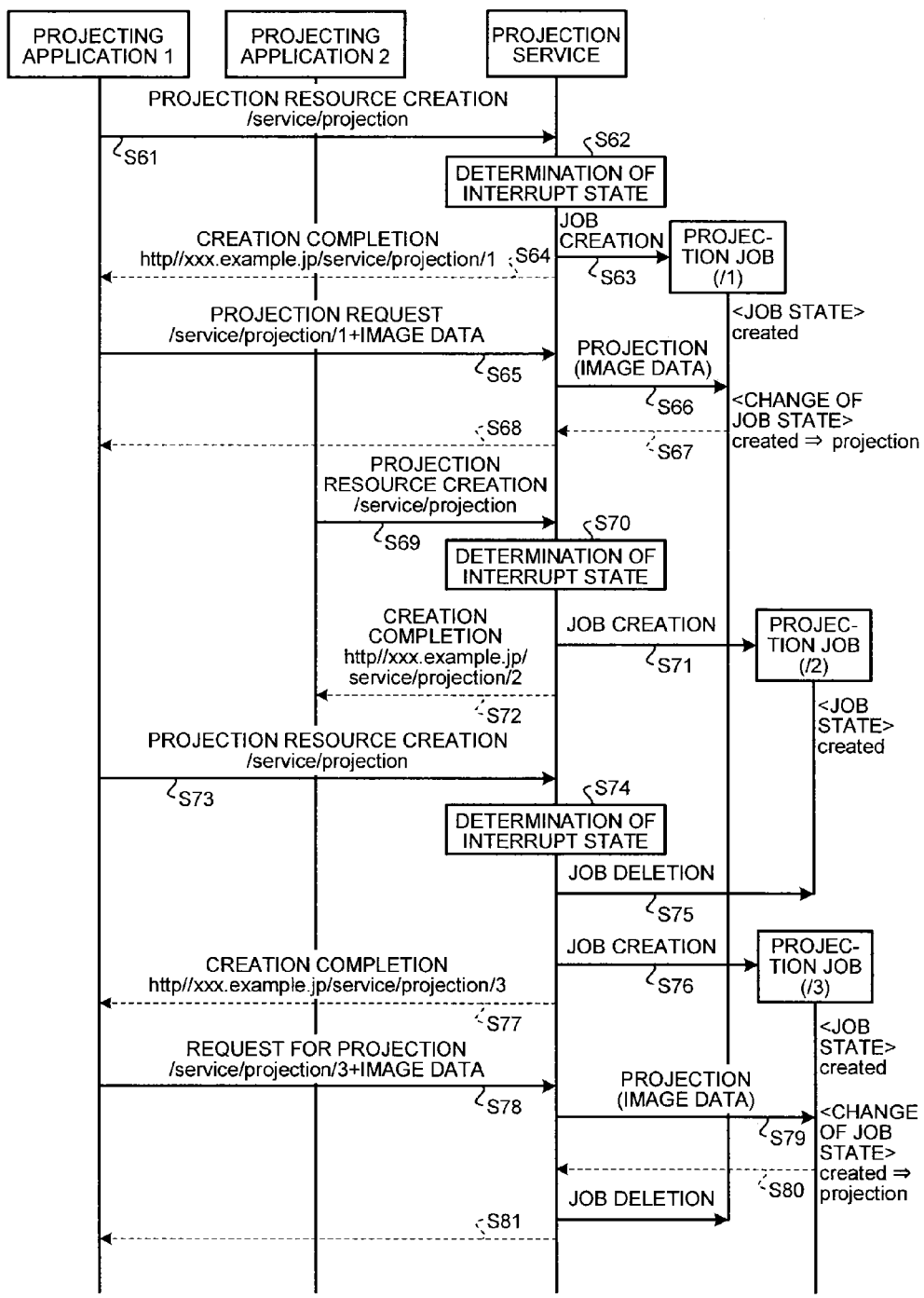
FIG. 8 is a sequence diagram of image display processing of the second embodiment.

FIG. 8 is a sequence diagram of image display processing of the second embodiment. Assume that a projection resource creation request is first sent from the projecting application 1 in the PC 150*a* to the projection service 610 in the projector 600 (Step S61).

When the communication unit 114 of the projector 600 receives the projection resource creation request, the job creation unit 112 determines an interrupt state (Step S62) and creates a projection job (Step S63). An ID of the created projection job is 1. At this time, a state of the projection job (/1) transitions to the created state.

When the projection job (/1) is created, the projection service 610 sends a notification of projection completion to the projecting application 1 in the PC 150*a* that is a request source (Step S64). In the notification of projection completion, the created ID of the projection job is included.

Assume that, after that, a projection request in which an ID=1 is specified by "/1" and image data to be projected are sent from the projecting application 1 in the PC 150*a* to the projector 600 (Step S65). The communication unit 114 of the projector 600 receives the projection request and the image data, and the execution control unit 113 instructs the projection job having an ID=1 to project the image data (Step S66). Accordingly, a state of the projection job having an ID=1 transitions to the projection state and the projection job performs projecting and displaying the image data. The projection job sends a notification of projection to the projection service 610 (Step S67). The communication unit 114 of the projection service 610 sends a notification of projection to the application 1 in the PC 150*a* that is a request source (Step S68).

Assume that a projection resource creation request is then sent from the projecting application 2 in the PC 150*b* to the projection service 610 in the projector 600 (Step S69).

When the communication unit 114 of the projector 600 receives the projection resource creation request, the job creation unit 112 determines an interrupt state (Step S70) and creates a projection job (Step S71). An ID of the created projection job is 2. Accordingly, a state of the projection job (/2) transitions to the created state.

When the projection job (/2) is created, the projection service 610 sends a notification of creation completion to the projecting application 2 in the PC 150*b* that is a request source (Step S72).

Assume that, after that, a projection resource creation request is further sent from the projecting application 1 in the PC 150*a* to the projection service 610 of the projector 600 (Step S73). The communication unit 114 of the projector 600 receives the projection resource creation request and the job creation unit 112 determines an interrupt state (Step S74). The state transition management unit 611 deletes the projection job (/2) having the ID=2 (Step S75). Subsequently, the job creation unit 112 creates a projection job having an ID=3 (Step S76). A state of the projection job having the ID=3 transitions to the created state. Reason to delete the projection job having the ID=2 is that two projection jobs in the created state coexist if not deleting. Then, the communication unit 114 sends a notification of projection completion to a request source (Step S77).

Assume that, after that, a projection request in which an ID=3 is specified by "/3" and image data to be projected are sent from the projecting application 1 in the PC 150*a* to the projector 600 (Step S78). The communication unit 114 of the projector 600 receives the projection request and the image data, and the execution control unit 113 instructs the projection job having the ID=3 to project the image data (Step S79). Accordingly, a state of the projection job having the ID=3 transitions to the projection state and the projection job performs projecting and displaying the image data. The projection job sends a notification of projection to the projection service 610 (Step S80).

Then, the state transition management unit 611 deletes another projection job (/1) having the ID=1 in the projection state to avoid that two projection jobs in the projection state coexist. The communication unit 114 sends a notification of projection to the application 1 in the PC 150*a* that is a request source (Step S81).

In this way, according to the present embodiment, state transition of a projection job is managed to perform control so that a plurality of projection jobs do not exist in each of the created state and the projection state. As a result, management of projection suitable for a function of the projector 600 can be performed.

Further, according to the present embodiment, when an interrupt occurs, a resource of a projection job is deleted. A user of the projector can thus understand that an interrupt has been occurred when the user's projection job disappears.

Modification

In the embodiment as described above, when the projector 600 receives a first projection resource creation request, the interrupt control unit 111 changes an interrupt state. A configuration in which the interrupt control unit 111 changes an interrupt state at different timing after the first projection resource creation request is received may be employed. Accordingly, a setting that has been set at projection can be changed without deleting a screen.

Figure 9:
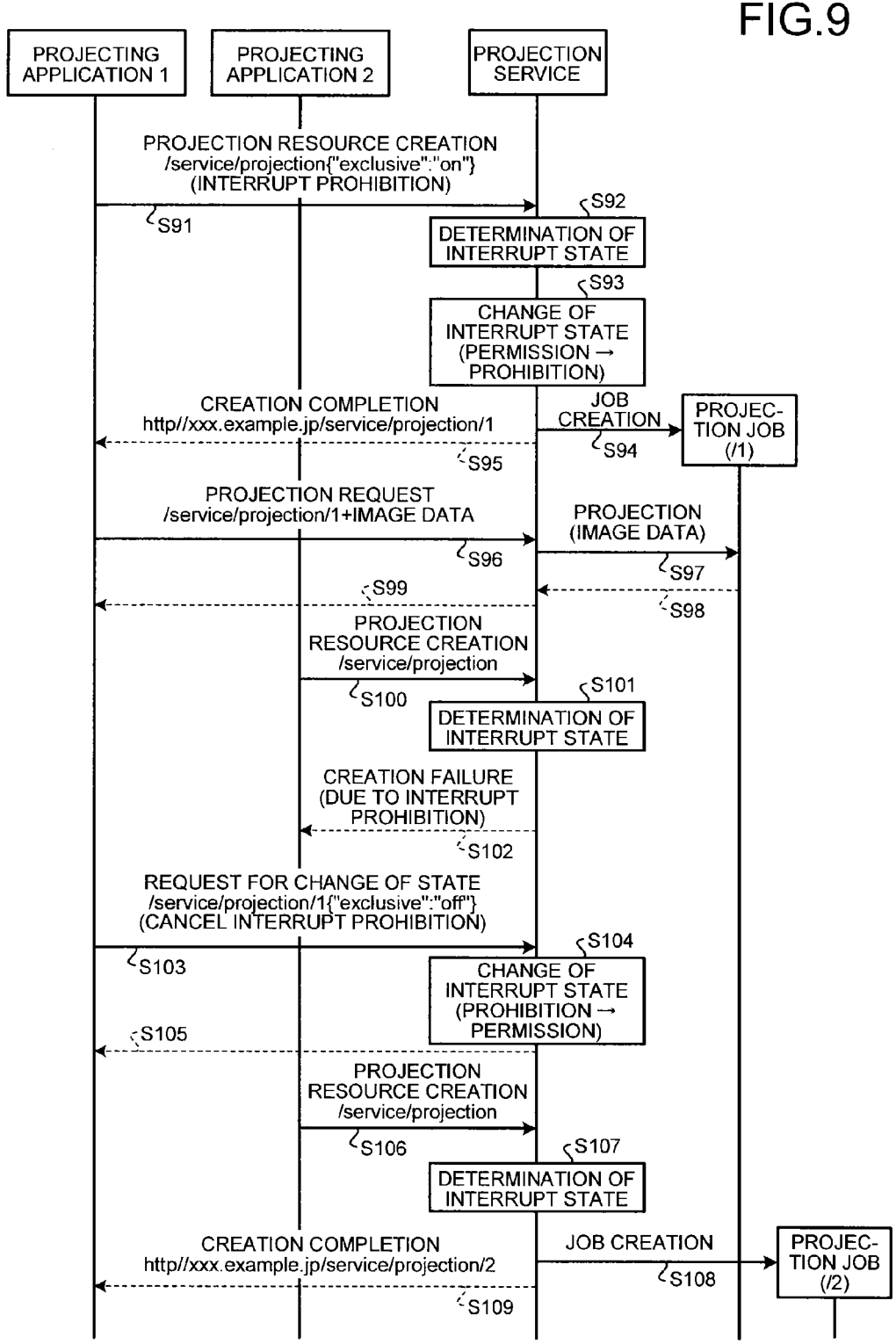
FIG. 9 is a sequence diagram of image display processing of a modification.

FIG. 9 is a sequence diagram of image display processing of a modification. Although the sequence of the modification is basically the same as that of the second embodiment of the present invention, an interrupt state is changed at a timing after the first projection resource creation request is received (Step S93) or at an arbitrary timing after this.

In an example illustrated in FIG. 9, when the communication unit 114 of the projector 600 receives a state change request from the projecting application 1 in the PC 150*a* (Step S103), the interrupt control unit 111 changes an interrupt state from the interrupt prohibition state to the interrupt permission state (Step S104).

A projection resource creation request at Step S100 before an interrupt state is changed fails (Step S102). However, after an interrupt state is changed to the interrupt permission state at Step S104, if the communication unit 114 receives a projection resource creation request from the projecting application 2 in the PC 150*b* (Step S106), it is determined that an interrupt state is the interrupt permission state at determination of the interrupt state (Step S107). As a result, the job creation unit 112 creates a new projection job (/2) having an ID=2 (Step S108).

In this way, an interrupt state of a projection job can be changed in the middle and flexible interrupt control can be achieved.

An image display program that is executed on the projectors 100, 600 according to the embodiments described above is provided by being installed in a ROM or the like in advance.

The projectors 100, 600 according to the embodiments described above may be structured so that the image display program is provided by being recorded in an installable or executable file format in a computer-readable recording medium, such as a compact disk read-only memory (CD-ROM), a flexible disk (FD), a compact disk recordable (CD-R), and a digital versatile disk (DVD).

Furthermore, the projectors 100, 600 according to the embodiments described above may be structured so that the image display program may also be provided by being stored in a computer connected to a network such as the Internet so as to be downloaded through the network. The projector 100, 600 according to the embodiments described above may also be structured so that the image display program may be provided or distributed over a network such as the Internet.

The projectors 100, 600 according to the embodiments described above have a module structure including the units described above (the communication unit 114, the interrupt control unit 111, the job creation unit 112, the execution control unit 113, and the state transition management unit 611). As actual hardware structure, a CPU (processor) reads the image display program from the ROM to execute it, whereby the units are loaded on a main storage unit, so that the units (the communication unit 114, the interrupt control unit 111, the job creation unit 112, the execution control unit 113, and the state transition management unit 611) are created on the main storage unit.

The present invention can provide an advantageous effect that development of software or the like necessary to project and display an image on an image display apparatus while connecting the image display apparatus and an external device through a network can be streamlined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projector connected to one or more external devices through a network, the projector comprising:
    a network interface; and
    a processor configured to
        generate, in response to receiving a request for generating a projection job from a first external device among the one or more external devices via the network interface, the projection job to project and display an image, which includes identification information to identify the projection job,
        send, after generating the projection job, the identification information included in the generated projection job to the first external device, and
        control, in response to receiving, from the first external device to which the identification information was sent, a request for projecting, which includes the identification information previously sent to the first external device and image data to be projected, the projection job to project and display the image based on the received image data included in the received request for projecting,
        wherein the processor is further configured to generate and project a second projection job in response to receiving a second request for generating the second projection job from a second external device among the one or more external devices while an interrupt state is an interrupt permission state, during projection of the projection job.

2. The projector according to claim 1, further comprising:
    a memory configured to store an interrupt state, which is switchable between an interrupt permission state and an interrupt prohibition state, and wherein
    the processor is further configured to switch the interrupt state to the interrupt prohibition state from the interrupt permission state, and
        send, in response to receiving a second request for generating a projection job from a second external device among the one or more external devices while the interrupt state is the interrupt prohibition state, information to the second external device, the information indicating that generating a second projection job based on the second request has failed.

3. The image display apparatus projector according to claim 1, further comprising
    a memory configured to store an interrupt state, which is switchable between an interrupt permission state and an interrupt prohibition state,
    wherein the processor is further configured to switch the interrupt state to the interrupt permission state from the interrupt prohibition state in response to receiving a request for change of state from the first external device during projection of the projection job, the request including the identification information.

4. An image projection method performed on a projector, comprising:
    generating, in response to receiving a request for generating a projection job from a first external device among one or more external devices via a network interface of the projector, the projection job to project and display an image, which includes identification information to identify the projection job;
    storing the generated projection job in a memory of the projector;
    sending, after generating the projection job, the identification information included in the generated projection job to the first external device;
    controlling, in response to receiving, from the first external device to which the identification information was sent, a request for projecting, which includes the identification information previously sent to the first external device and image data to be projected, the stored projection job to project and display the image based on the image data included in the received request for projecting; and
    generating and projecting a second projection job in response to receiving a second request for generating the second projection job from a second external device among the one or more external devices while an interrupt state is an interrupt permission state, during projection of the projection job.

5. The image projection method according to claim 4, further comprising:
    storing an interrupt state that is switchable between an interrupt permission state and an interrupt prohibition state;
    switching the interrupt state to the interrupt prohibition state from the interrupt permission state; and
    sending, in response to receiving a second request for generating a projection job from a second external device among the one or more external devices while the interrupt state is the interrupt prohibition state, information to the second external device, the information indicating that generating a second projection job based on the second request has failed.

6. The image projection method according to claim 4, further comprising:
    storing an interrupt state that is switchable between an interrupt permission state and an interrupt prohibition state; and
    switching the interrupt state to the interrupt permission state from the interrupt prohibition state in response to receiving a request for change of state from the first external device during projection of the projection job, the request including the identification information.

7. A non-transitory computer-readable medium storing a computer program that when executed by a processor of a projector, causes the processor to perform an image projection method comprising:

generating, in response to receiving a request for generating a projection job from a first external device among one or more external devices via a network interface of the projector, the projection job to project and display an image, which includes identification information to identify the projection job;

storing the generated projection job in a memory of the projector;

sending, after generating the projection job, the identification information included in the generated projection job to the first external device; and controlling, in response to receiving, from the first external device to which the identification information was sent, a request for projecting, which includes the identification information previously sent to the first external device and image data to be projected, the stored projection job to project and display the image based on the image data included in the received request for projecting; and generating and projecting a second projection job in response to receiving a second request for generating the second projection job from a second external device among the one or more external devices while an interrupt state is an interrupt permission state, during projection of the projection job.

8. The computer-readable medium according to claim 7, wherein the method further comprises:

storing an interrupt state that is switchable between an interrupt permission state and an interrupt prohibition state;

switching the interrupt state to the interrupt prohibition state from the interrupt permission state; and sending, in response to receiving a second request for generating a projection job from a second external device among the one or more external devices while the interrupt state is the interrupt prohibition state, information to the second external device, the information indicating that generating a second projection job based on the second request has failed.

9. The computer-readable medium according to claim 7, wherein the method further comprises:

storing an interrupt state that is switchable between an interrupt permission state and an interrupt prohibition state; and switching the interrupt state to the interrupt permission state from the interrupt prohibition state in response to receiving a request for change of state from the first external device during projection of the projection job, the request including the identification information.

* * * * *